United States Patent [19]

Walrath et al.

[11] 4,420,535

[45] Dec. 13, 1983

[54] BONDABLE POLYAMIDE

[75] Inventors: George A. Walrath, Scotia; Scott D. Smith, Ballston, both of N.Y.

[73] Assignee: Schenectady Chemicals, Inc., Schenectady, N.Y.

[21] Appl. No.: 311,385

[22] Filed: Oct. 14, 1981

[51] Int. Cl.³ .................. B32B 15/00; B32B 27/00; H01B 7/00

[52] U.S. Cl. .................. 428/379; 428/383; 428/458; 174/120 SR; 528/339

[58] Field of Search .......... 428/383, 380, 379, 458; 174/110 N, 120 SR; 528/339, 84

[56] References Cited

U.S. PATENT DOCUMENTS

| | | | |
|---|---|---|---|
| 2,268,586 | 1/1942 | Gilman | 528/84 |
| 3,642,715 | 2/1972 | Allard | 528/84 |
| 4,072,665 | 2/1978 | Onder | 528/84 |
| 4,087,481 | 5/1981 | Onder | 528/339 |
| 4,163,826 | 8/1979 | Kawaguchi et al. | 428/371 |
| 4,216,263 | 8/1980 | Otis et al. | 428/383 |
| 4,216,263 | 8/1980 | Otis et al. | 428/383 |
| 4,238,603 | 12/1980 | Chapman et al. | 528/339 |

FOREIGN PATENT DOCUMENTS

| | | | |
|---|---|---|---|
| 51-197607 | 7/1976 | Japan | 174/110 N |
| 1282370 | 7/1972 | United Kingdom . | |

*Primary Examiner*—George F. Lesmes
*Assistant Examiner*—B. K. Johnson
*Attorney, Agent, or Firm*—Cushman, Darby & Cushman

[57] ABSTRACT

Self-bondable polyamides are prepared by reacting an aromatic diisocyanate or diamine with a mixture of terephthalic acid and an aliphatic dibasic acid having at least 6 carbon atoms. These self-bondable amides can also be used as topcoats for wires having basecoats of another polymer, e.g. a polyester, polyester-imide, or polyamideimide.

73 Claims, 2 Drawing Figures

BONDABLE POLYAMIDE

BACKGROUND OF THE INVENTION

The present invention relates to a novel self bondable aromatic aliphatic polyamide.

An all-aromatic polyamide as made in accordance with Allard U.S. Pat. No. 3,642,715 does not exhibit self-bonding characteristics even when tested via the NEMA Bonding Test No. 57.1.1.2. at temperatures up to 260° C. The all-aliphatic polyamides as described by the work of Otis U.S. Pat. No. 4,216,263 and Kawaguchi U.S. Pat. No. 4,163,826 are thermoplastic in nature and exhibit good bonding characteristics but do not offer the excellent humidity resistance and resistance to attack by refrigerants as do the aromatic-aliphatic polyamides of the present invention.

Gilman U.S. Pat. No. 2,268,586 has a broad teaching of making polyamides by reacting a dibasic acid with a diisocyanate but does not show self-bondable polyamides.

Onder U.S. Pat. No. 4,072,665 discloses a novel copolymer of the formula where R is 60 to 85 percent of an aliphatic dibasic carboxylic acid with $(CH_2)_x$ recurring units and x being an integer of 7 to 12 inclusive, the remaining 15 to 40 percent of R being m-phenylene. The proportions are indicated to be critical in Onder. Onder also indicates on column 6, lines 43-52 that a portion of the recurring units up to 10% can have R from a different dicarboxylic acid, e.g. terephthalic acid. Onder uses his products for many things including wire coatings, column 6, lines 11-22. However, Onder makes no mention of a solution cast film which is baked and yet retains self-sealing or adhesive properties.

SUMMARY OF THE INVENTION

There have now been prepared random aromatic-aliphatic copolyamides having the recurring unit where AL is the divalent hydrocarbon residue of an unsubstituted aliphatic dicarboxylic acid having 6 to 36 carbon atoms or more, usually AL is $(CH_2)_x$ where x is 4 to 34, preferably 6 to 12, most preferably 10. However, AL can be the residue of an unsaturated dicarboxylic acid, e.g. dimerized linoleic acid or dimerized oleic acid or dimerized tall oil. R is tolylene, phenyl, where F is O, $CH_2$ or $SO_2$. Less preferably all or a part of R can be cycloaliphatic, e.g. cyclohexylene or methylenedicyclohexyl, Ar is p-phenylene, y is 35 to 80% of the recurring units and z is 65 to 20% of the recurring units. Usually y is 40 to 70% of the recurring units and preferably y is about 60 to 70%, most preferably 65% of the recurring units. If y is above 70% there is a tendency to gel on standing.

The copolyamides can be prepared in conventional manner by reacting a mixture of the dicarboxylic acids, e.g. dodecanedioic acid and terephthalic acid with a diisocyanate, e.g. toluene diisocyanate or methylene diphenyldiisocyanate, or with the corresponding diamine, e.g. toluene diamine, 4,4'-methylene diphenyl diamine (methylene dianiline), oxydianiline, phenylene diamine, diaminodiphenyl sulfone, or a mixture of such diisocyanates or of such diamines. As indicated there can also be employed a minor amount of 4,4'-methylene diphenyl diamine or cyclohexyl diamine. In reacting with the diamine rather than the diisocyanate it is of course possible to employ other acylating agents than the acid, e.g. there can be used the acyl halides, e.g. the dichloride or dibromide of dodecandioic acid or the lower alkyl esters, e.g. dimethyl dodecandioate, diethyl dodecandioate, and dibutyl dodecanedioate.

Preferably in the formula R has the mole percent ratio of 4-methyl-m-phenylene/2-methyl-m-phenylene/4,4'-methylene diphenylene in the range of 40/10/50 to 80/20/0. The reaction is carried out in an amide solvent such as N-methyl-2-pyrrolidone (NMP).

The copolyamides of the invention are useful as a self-bonding coating for magnet wire. This coating is usually applied in an amide based solvent system, e.g., N-methyl pyrrolidone or a mixture of N-methyl pyrrolidone and an aromatic hydrocarbon. The major advantages offered by this novel enamel are:

(1) High temperature retention of bond strength.

(2) The quality of the base coat is not lessened, and in some cases, the quality of the base coat is improved by the bonding overcoat.

(3) The coating is resistant to attack by refrigerants.

(4) The coating has improved humidity resistance.

(5) The coating has improved chemical resistance.

(6) The coating is less costly than commercially available alternatives.

(7) The end user's cost is reduced by elimination of a costly secondary insulation.

(8) By eliminating the solvent-borne secondary insulation requirement, the bond coat offers obvious ecological advantages.

(9) Good adhesion to self-supporting high-temperature films.

Thus, the novel, self-bonding wire coating provides the magnet wire user an economical and ecological alternative with significant improvements in bond strengths, hermetic resistance, and chemical resistance when compared to other self-bond wire coatings. This novel coating also offers the motor manufacturer an option to eliminate secondary insulations as the self-bonding wire coating will produce results equivalent to or better than those achieved with the secondary insulations currently used.

It was previously pointed out that the copolyamides of the present invention are superior, in humidity resistance and resistance to attack by refrigerants, to the products of Otis U.S. Pat. No. 4,216,263. Thus when a sample of a polyamide as described in Otis is subjected to a 100 percent humidity at 70° C., it exhibits an initial resistance of about 370,000 megohms. After aging one week, the megohm resistance was about 280,000 megohms; after two weeks, the resistance had dropped to about 160,000 megohms. The aromatic-aliphatic polyamide of the present invention (based on Mondur TD-80, 4,4-methylene diphenylenediisocyanate, terephthalic acid and dodecanedioic acid), when submitted to this test, gave the following results:

| Initial | After One Week | After Two Weeks |
| --- | --- | --- |
| 422,000 megohms | 900,000 megohms | 820,000 megohms |

The dielectrics of the all-aliphatic polyamides of Otis were reduced by 50 percent after two weeks at 100 percent relative humidity and 70° C. The aromatic-aliphatic polyamides of this invention, however, did not significantly change after the two-week aging. The all-aliphatic nylons are true thermoplastics, unlike the aromatic-aliphatic polyamides of the invention which, when initially bonded at 200° C., retain good bond strength at 200° C. The aromatic-aliphatic polyamides of the invention, when coated over a polyester of the type described by Meyer in U.S. Pat. Nos. 3,201,276 and 3,211,585, will upgrade the base polyester to a NEMA Class 155° C. or greater magnet wire coating system. The entire disclosure of the Meyer patents are hereby incorporated by reference and relied upon. When coated over other wire enamels or wire enamel systems, the inherent properties of the coated wire are not adversely effected. The aliphatic-aromatic polyamides of this invention will self-bond at temperatures of 170° C. or greater when tested in accordance with NEMA Test Specification 57.1.1.2 with resulting bond strengths of greater than seven pounds when broken at 180° C.

When this novel enamel is coated over a self-supporting, high-temperature film, such as a polyimide, polyparabanic acid, polyamide, or polyamide-imide film, then baked to dry, the film may then be self-bonded and will exhibit outstanding inner laminar adhesion.

If a polyamide, in 70/30 nmp/xylene, is made from 100% of an alkanedioic acid such as dodecanedioic acid and a mixture of toluene diisocyanate and methylene diphenyl diisocyanate, then the enamel product gels on standing. In fact there is a tendency for gelation to occur if the amount of dodecanedioic acid goes above 70 mole percent and especially above 78 mole percent based on the total of dodecanedioic acid and terephthalic acid.

Among the advantages of the copolyamides of the invention, in addition to or in amplification of those set forth above are:

(1) The wire coating is bondable at 200° C. and yet retains good bond strength at 180° C. However, once the polymer is "Heat Set" above the apparent glass transition temperature of the aromatic-aliphatic polyamide, the apparent glass transition temperature increases, thus giving some thermoset properties to the coating.

(2) The aromatic-aliphatic polyamide system of the invention is the only amide bonding system offered which is not in part a physical blend of an all aliphatic amide such as Nylon 6;6,6; 11 or 12. The aromatic-aliphatic polyamide is, however, an in situ reaction product of an aromatic diacid and an aliphatic diacid, preferably with a blend of aromatic diisocyanates to yield a random aromatic-aliphatic polymer. The preferred reactants are terephthalic acid and dodecanedioic acid with toluene diisocyanate and methylenediphenyl diisocyanate in a 70:30 mole ratio. The reaction is carried out in an amide-type solvent such as N-methyl-2-pyrrolidone.

(3) The aromatic-aliphatic polyamide, when coated over ISONEL 200, yields a Class 155° C. magnet wire; and, with the exception of the heat shock, displays Class 180° C. properties.

When coated over ISOMID, excellent properties as a Class 180° C. magnet wire are observed.

(4) The aromatic-aliphatic polyamide coated over ISONEL 200 pases the A. O. Smith Freon Blister Test; conventional Nylon 6,6 coated over ISONEL 200 fails this test.

(5) The moisture resistance of the aromatic-aliphatic polyamide is also superior to the Nylon 11 types.

(6) The aromatic-aliphatic polyamides offer a significant cost advantage over the systems based upon Nylon 11 or 12.

As indicated above the enamels of the invention exhibit good bond strengths when coated over ISONEL 200 and ISOMID wire enamel. Thus when bonded at 200° C. for 20 minutes they have shown bond strengths of 1 to 6.2 lbs. and even up to 7.4 pounds at 180° C. without degrading other wire properties by application of the bond coat.

The heat-bondable copolyamide film of the invention can be applied by conventional wire coating techniques to give a wire that may be wound into coils, armatures, stators, etc., and heat bonded, thereby eliminating the need for an impregnating varnish, to give a wire-insulation system of unusual thermal resistance. In the process of eliminating the need for a varnish dip, the need for expensive dipping apparatus ovens, lengthy cure cycles, and high energy costs are eliminated.

The bondable copolyamide of the invention can be employed, for example, as a top coat over a wire having a base coat or coats of, for example:

1. a glycerine or other aliphatic polyhydric alcohol polyester, e.g. glycerineethylene glycol terephthalate polymer as in Precopio U.S. Pat. No. 2,936,296, 2. tris(2-hydroxyethyl)isocyanurate polyester, e.g. tris(2-hydroxyethyl) isocyanurate(THEIC)ethylene glycol-terephthalate polymer as in Meyer U.S. Pat. No. 3,342,780, 3. a polyester coated with an amide-imide polymer, e.g. the polyester of Precopio or Meyer 3,342,780 coated with an amide-imide polymer as shown in Koerner U.S. Pat. No. 3,022,200 and Standard Oil British Pat. No. 1,056,564.

4. a polyester-imide which is the reaction product of THEIC, ethylene glycol, terephthalic acid (or isophthalic acid), methylene dianiline (or oxydianiline) and trimellitic anhydride, e.g. as in Meyer U.S. Pat. No. 3,426,098. In place of THEIC, there can be used glycerine, e.g. as in the polyester-imides of Schmidt U.S. Pat. No. 3,697,471. Likewise, there can be used as the base coat the diethylene glycol or triethylene glycol monoether modified polyester-imide resins of Keating U.S. Pat. No. 4,119,608, 5. amide-imide coated polyester-imide as in the Koerner and Standard Oil patents, 6. monolithic amide-imide as in the Standard Oil patent, 7. polyimide such as Pyre ML as in Edwards U.S. Pat. Nos. 3,179,634; 3,179,630; 3,179,631; 3,179,632, and 3,179,633, 8. as a coating over an acrylic (acrylic-methacrylic acid ester) top coated polyimide of the type of Lecton (DuPont), 9. conventional Formvar (polyvinyl formal), epoxy (e.g. bisphenol A-epichlorohydrin), urethane, and nylon top coated urethane. The entire disclosures of the Meyer Pat. No. 3,342,780, Precopio, Koerner, Standard Oil, Keating, Meyer U.S. Pat. No. 3,426,098, and the Edwards patents are hereby incorporated by reference and relied upon.

The wire enamels can be applied to either bare or base coated copper, aluminum, silver, or other wires using conventional coating procedures and wire speeds, e.g., 30–150 ft/min. and curing the wire is carried out at conventional temperatures. The speed is adjusted according to wire size and enamel to obtain optimum cure as is known in the art.

The copolyamides of the invention are also useful as bondable coatings over film wrapped wire, e.g.

1. Kapton—a polyimide film of DuPont as in the Edwards patents
2. Nomex—a DuPont aromatic polyamide (isophthalic acid with an aromatic diamine).

The copolyamides of the invention can be used as adhesives to apply over self-supporting films, e.g. used in printed circuit boards and capacitors. Typical self-supported films include Kapton polyimide, Mylar (polyethylene terephthalate) polyester, Nomex, polytetrafluoroethylene and perfluoroethylene-perfluoropropylene copolymer.

The copolyamides of the invention can be employed as cast films for adhesive use. The film is cast from solution and can then be used as an adhesive.

In film, strand or filament form the copolyamide can be used as a substitute for Dacron in wrapped glass cloth. Dacron is not high temperature resistant. Hence replacing the Dacron filaments by filaments of the copolyamide of the invention gives higher temperature resistant products.

Nomex is available as cast or sheet insulation. The heat bondable copolyamide of the invention can be used as a wrapping therefore to hold the Nomex together.

The composition can comprise, consist essentially of, or consist of the materials set forth.

EXAMPLE 1

This example is a working example of the present invention.

| Raw Materials | | Load in Grams |
|---|---|---|
| (1) | N—methyl-2-pyrrolidone | 4168 |
| (2) | Toluene diisocyanate (Mondur TD-80)* | 1033 |
| (3) | 4,4' Methylene diphenyldiisocyanate | 637 |
| (4) | Terephthalic Acid | 494 |
| (5) | Dodecanedioic Acid | 1267 |
| (6) | Xylene | 2243 |
| (7) | N—methyl-2-pyrrolidone | 1050 |

*Mondur TD-80 is a 80/20 blend of 4-methyl-m-phenylene diisocyanate and 2-methyl-m-phenylene diisocyanate and is commercially available from Mobay Chemical Company, Pittsburgh, Pennsylvania.

Parts one through three charged at room temperature into a 12-liter, round-bottom reaction flask, equipped with an agitator, a thermometer, an inert gas purge, and a water-cooled condenser fitted with a flexible tube which was immersed in a flask containing a mixture of water and denatured ethyl alcohol. (The reaction by-products carried through the condenser by the carbon dioxide and nitrogen are trapped in the water-alcohol solution). Parts four and five were added at room temperature with agitation and a blanket of nitrogen was applied over the reaction. The temperature was raised slowly by use of an electric heating mantel to approximately 75° C. when carbon dioxide evolution began. The external heat was then reduced and the temperature of the batch was allowed to rise over a four-hour time period to approximately 170° C. At about 80° C., the batch became clear. After an approximate four-hour hold at 170° to 175° C., the reaction was allowed to cool slowly to room temperature over night. The next morning the reaction mixture was sampled and a 60 percent solution in N-methyl-2-pyrrolidone was determined to have a viscosity at 25° C. on the Gardner-Holdt scale of W ½. Parts six and seven were then added. The final viscosity of the solution at 25° C. was Z on the Gardner-Holdt scale, or 2,500 centipoises as measured by a Brookfield RVT Viscometer.

The percent non-volatiles of the solution were determined to be 27 percent by baking a two-gram sample for two hours at 200° C. The specific gravity of the solution was determined to be 1.025 at 25° C. This solution was then used to overcoat a commercially available polyester (ISONEL 200). The test properties were as shown in Table One. It was also coated over a commercially available polyester-imide (ISOMID)* and tested as shown in Table One.

**ISONEL 200 is a commercially-available polyester wire coating from Schenectady Chemicals, Inc., Schenectady, N.Y. and is tris(2-hydroxyethyl)isocyanurate-ethylene glycol-terephthalic acid polymer.
***ISOMID is a commercially-available polyesterimide wire enamel also from Schenectady Chemicals, Inc., Schenectady, N.Y. and is a tris(2-hydroxyethyl)isocyanurate-ethylene glycol terephthalic acid-methylene dianiline-trimellitic anhydride polymer.

The temperature of coating the wires in all of the examples was 370°–480° C.

EXAMPLE 2

| Raw Materials | | Load in Grams |
|---|---|---|
| (1) | N—methyl-2-pyrrolidone | 4168 |
| (2) | Toluene diisocyanate (Mondur TD-80) | 1033 |
| (3) | 4,4-Methylene diphenyldiisocyanate | 637 |
| (4) | Terephthalic Acid | 494 |
| (5) | Dodecanedioic Acid | 1267 |
| (6) | Xylene | 1982 |
| (7) | N—methyl-2-pyrrolidone | 910 |

The reaction was carried out much in the same fashion as described in example one, with the exception of the over night cooling step. The reaction medium was sampled after a three-hour hold at 165° to 180° C. at 60 percent in N-methyl-2-pyrrolidone and found to have a viscosity of V ½ at 25° C. on the Gardner-Holdt Scale. The batch was then reduced with six and seven to a final viscosity of Y ¼ at 25° C. on the Gardner-Holdt Scale at 28.45 percent non-volatiles determined as described in Example One.

The material was then coated over a polyester (ISONEL 200), a polyester imide (ISOMID), a polyester overcoated with a polyamide-imide, (ISONEL 200 overcoated with trimellitic anhydride-methylene dianiline polymer), a polyamide-imide (trimellitic anhydride-methylene dianiline polymer) wire coating and as a monolithic enamel. The results of the testing on the coated conductors are as shown in Table one.

EXAMPLES 3 THROUGH 8

Figure 1:
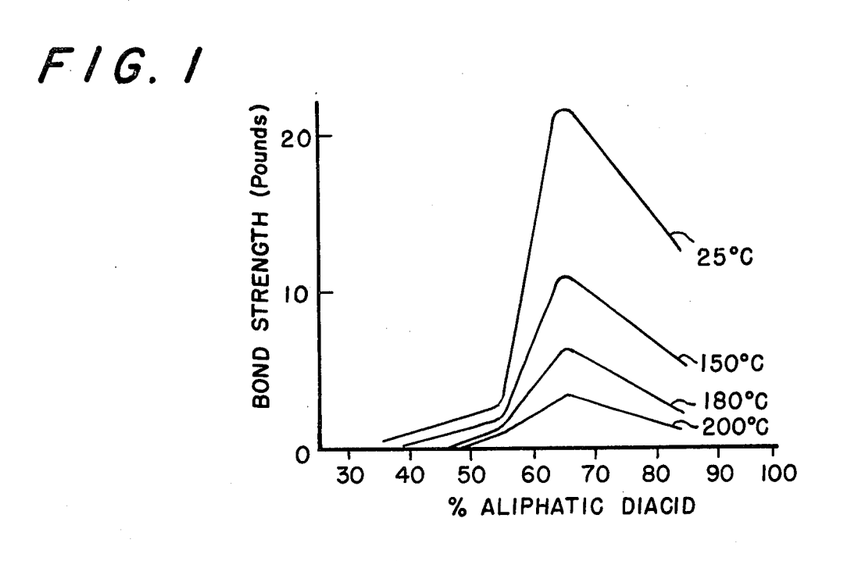
FIG. 1 is a graph of bond strength vs. percent of aliphatic dibasic acid (dodecanedioic acid)

Examples Three through Eight describe the effects of the mole percent ratio of aliphatic diacid to aromatic diacid. The effects on bond strength are shown on Graph Number One. (Bond strength versus percent aliphatic diacid). Also shown on Graph Number One is the relationship of bond strength to breaking temperature. The other properties of the coated conductors are as displayed in Table One.

The general procedure for making these enamels is as described in Example One.

| Example | 3 | 4 | 5 | 6 | 7 | 8 |
|---|---|---|---|---|---|---|
| Reactants | | | Batch weight | | | |
| (1) N—methyl-2-pyrrolidone | 644 | 611 | 623 | 633 | 655 | 664 |
| (2) Toluene diisocyanate | 159 | 159 | 159 | 159 | 159 | 159 |
| (3) 4,4'-methylene diphenyl diisocyanate | 98 | 98 | 98 | 98 | 98 | 98 |
| (4) Terephthalic Acid | 76 | 141 | 118 | 97 | 54 | 32 |
| (5) Dodecanedioic Acid | 194 | 104 | 135 | 164 | 224 | 254 |
| (6) Xylene | 327 | 382 | 346 | 331 | 335 | 366 |
| (7) N—methyl-2-pyrrolidone | 119 | 140 | 241 | 140 | 126 | 210 |
| Gardner-Holdt Viscosity @ 25° C. | Y¾ | X½ | Y+ | Z+ | Y¼ | Y |
| Percent Non-Volatiles Determined 2 gm., 2 hr., 200° C. | 27.8 | 24.9 | 25.2 | 26.8 | 23.8 | 25.7 |

EXAMPLE 9

This example describes the use of an aliphatic acid as described in the disclosure where X equals four.

| Reactants | Batch Weight |
|---|---|
| (1) N—methyl-2-pyrrolidone | 600 |
| (2) Toluene diisocyanate | 171 |
| (3) 4,4' Methylene diphenyldiisocyanate | 105 |
| (4) Terephthalic Acid | 81 |
| (5) Adipic Acid | 133 |
| (6) Xylene | 257 |
| Gardner-Holdt Viscosity (25° C.) | W½ |
| Determined Percent Non-Volatiles (2 grams, 2 hours, 200° C.) | 32.4 |

This example was prepared as described in Example One.

The properties of this enamel when used to overcoat ISOMID are as described in Table One.

EXAMPLE 10

This example describes the use of an aliphatic diacid as described in the disclosure where X equals seven.

| Reactants | Batch Weight |
|---|---|
| (1) N—methyl-2-pyrrolidone | 622 |
| (2) Toluene diisocyanate | 165 |
| (3) 4,4' Methylene diphenyl diisocyanate | 161 |
| (4) Terephthalic Acid | 78 |
| (5) Azelaic Acid | 165 |
| (6) N—methyl-2-pyrrolidone | 198 |
| (7) Xylene | 412 |
| Gardner-Holdt Viscosity (@ 25° C.) | X¾ |
| Determined percent Non-Volatiles (2 grams, 2 hours, 200° C.) | 22.9 |

This example was prepared in the same fashion as Example One. This enamel was applied on 18-AWG copper wire over ISOMID. The electrical test properties are as shown in Table one.

EXAMPLE 11

This example demonstrates the use of a diabasic acid where X equals eight.

| Reactants | Batch Weight |
|---|---|
| (1) N—methyl-2-pyrrolidone | 560 |
| (2) Toluene diisocyanate | 145 |
| (3) 4,4' Methylene diphenyl diisocyanate | 89 |
| (4) Terephthalic Acid | 69 |
| (5) Sebacic Acid | 156 |
| (6) N—methyl-2-pyrrolidone | 207 |
| (7) Xylene | 411 |
| Gardner-Holdt Viscosity (@ 25° C.) | X½ |
| Determined percent Non-Volatiles (2 grams, 2 hours, 200° C.) | 24.2 |

This example was prepared in accordance with the procedure described in Example One. The test results obtained when this enamel was applied over 18-AWG copper wire coated with ISOMID are shown in Table One.

EXAMPLE 12

This example indicates that the allowable number of methylene groups between the two carboxyl groups of the aliphatic diacid may not have an upper limit.

| Reactants | Batch Weight |
|---|---|
| (1) N—methyl-2-pyrrolidone | 585 |
| (2) Toluene diisocyanate | 94 |
| (3) 4,4' methylene diphenyl diisocyanate | 68 |
| (4) Terephthalic Acid | 45 |
| (5) Empol 1010* | 283 |
| (6) N—methyl-2-pyrrolidone | 140 |
| (7) Xylene | 310 |
| Gardner-Holdt Viscosity (@ 25° C.) | Y¼ |
| Determined percent Non-Volatiles (2 grams, 2 hours, 200° C.) | 29.4 |

*Empol 1010 is a $C_{36}$ dimerized fatty acid available from Emery Industries, Inc., Cincinnati, Ohio.

This reaction was cooked in accordance with the procedure outlined in Example One. The test results obtained when this enamel was applied over 18-AWG copper wire coated with ISOMID are shown in Table One.

EXAMPLE 13

This working example demonstrates the use of a cyclic aliphatic diisocyanate to replace a portion of the aromatic diisocyanate.

| Reactants | Batch Weight |
|---|---|
| (1) N—methyl-2-pyrrolidone | 600 |
| (2) Toluene diisocyanate | 146 |
| (3) Desmondur W* | 97 |
| (4) Dodecanedioic Acid | 179 |

| | -continued | |
|---|---|---|
| | Reactants | Batch Weight |
| (5) | Terephthalic Acid | 76 |
| (6) | N—methyl-2-pyrrolidone | 155 |
| (7) | Xylene | 323 |
| | Gardner-Holdt Viscosity (@ 25° C.) | Z¼ |
| | Determined Percent Non-Volatiles (2 grams, 2 hours, 200° C.) | 27.5 |

*Desmondur W is a cycloaliphatic diisocyanate available from Mobay Chemical Company, Pittsburgh, Pennsylvania.

This enamel was prepared as described in Example One. It was then applied as an overcoat to ISOMID-coated copper wire. The test results obtained from this construction are as shown in Table One.

EXAMPLE 14

This example shows the use of all toluene diisocyanate to make an acceptable bond coat.

| | Reactants | Batch Weight |
|---|---|---|
| (1) | N—methyl-2-pyrrolidone | 606 |
| (2) | Toluene diisocyanate | 226 |
| (3) | Dodecanedioic Acid | 194 |
| (4) | Terephthalic Acid | 76 |
| (5) | N—methyl-2-pyrrolidone | 210 |
| (6) | Xylene | 350 |
| | Gardner-Holdt Viscosity (@ 25° C.) | X¼ |
| | Determined percent Non-Volatiles (2 grams, 2 hours, 200° C.) | 27.2 |

This example was prepared using the procedure described in Example One. However, as indicated no 4,4'-methylene diphenyl diisocyanate was employed. When coated over 18-AWG ISOMID coated wire, the bond coat gave the properties as shown in Table One.

EXAMPLE 15

This example defines the lower preferred limit of toluene diisocyanate in the bond coat.

| | Reactants | Batch Weight |
|---|---|---|
| (1) | N—methyl-2-pyrrolidone | 615 |
| (2) | Toluene diisocyanate | 150 |
| (3) | 4,4' Methylene diphenyl diisocyanate | 179 |
| (4) | Dodecanedioic Acid | 70 |
| (5) | Terephthalic Acid | 140 |
| (6) | N—methyl-2-pyrrolidone | 35 |
| (7) | Xylene | 280 |
| | Gardner-Holdt Viscosity (@ 25° C.) | Y |
| | Determined Percent Non-Volatiles (2 grams, 2 hours, 220° C.) | 31.4 |

This enamel was also cooked as described in Example One. It was then applied to ISOMID coated 18-AWG copper wire giving the test results as reported in Table One.

COMPARATIVE EXAMPLE 1

A commercial solution of Nylon 66 was coated over a polyester wire enamel, namely, ISONEL 200. The resulting magnet wire exhibited the properties shown in Table One.

COMPARATIVE EXAMPLE 2

A solution of Nylon 11 was prepared in accordance with U.S. Pat. No. 4,216,263 by Otis. The viscosity of this solution was approximately Z5 ½ on the Gardner-Holdt Scale at 25° C. The percent non-volatiles of the solution was determined to be 16.1 percent by baking a two-gram sample for two hours at 200° C. This enamel solution was coated over a polyester-imide of the ISOMID type on AWG-24 copper wire. The electrical and bonding test results are shown in Table One.

COMPARATIVE EXAMPLE 3

Figure 2:
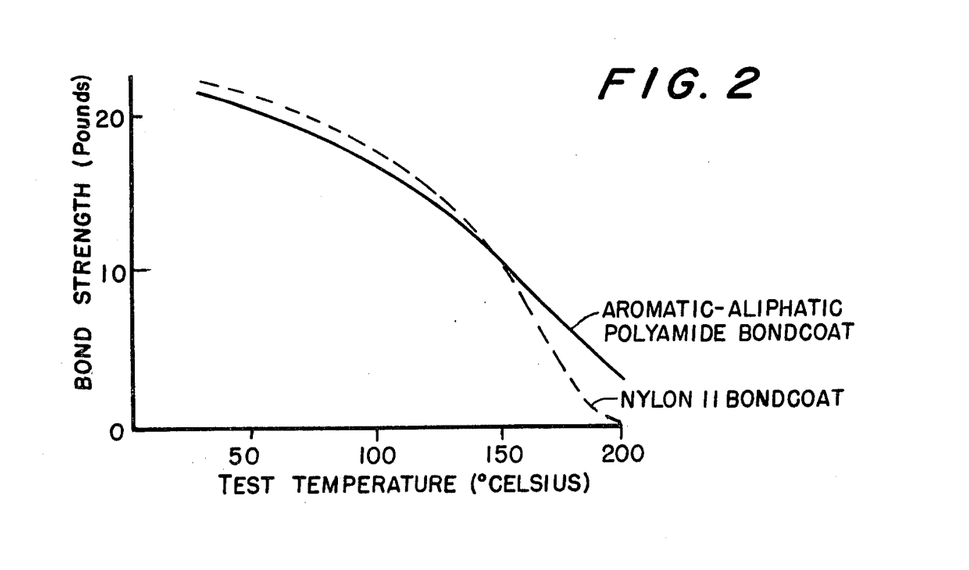
FIG. 2 is a graph comparing the bond strength of the copolyamide with that of Nylon 11.

A solution of Nylon 11 was prepared in accordance with U.S. Pat. No. 4,216,263 by Otis. The viscosity of the solution was approximately Z2 ¾ on the Gardner-Holdt Scale at 25° C. at approximately 16.1 percent non-volatiles determined as in Example One. This enamel was coated over a polyesterimide wire coating, namely ISOMID on 18-AWG copper wire. The test results are shown on Table One. A comparison of the bond strength of this example to the preferred composition of this disclosure as described by Example One is shown on Graph Number Two.

COMPARATIVE EXAMPLE 4

A solution of Nylon 11 was prepared in accordance with U.S. Pat. No. 4,216,263 Otis. The viscosity of this solution was approximately Z3 ½ on the Gardner-Holdt Scale at 25° C. The percent non-volatiles determined as in Example One were 16.8 percent. This enamel was coated over a polyester wire coating, namely ISONEL 200 on 18-AWG copper wire. The electrical and bonding test results are as shown in Table One.

| Abbreviation Key for Table 1 | |
|---|---|
| F.O.M. | Figure of Merit |
| Hrs. | Hours |
| FPM | Feet per Minute |
| VPM | Volts per Mil |
| Base Coat: | |
| PE | Polyester of the ISONEL ® 200 type |
| PEI | Polyester-imide of the ISOMID ® type |
| PAI | Aromatic polyamide-imide |
| PAI/PE | Polyamide imide based upon 4,4' methylene diphenyl diisocyanate and trimellitic anhydride overcoated over a polyester of the ISONEL ® 200 type |
| None | Indicates the bond coat was applied in eight passes to obtain a three-mil build |
| Build | total increase in the wire diameter as a result of the coating. |
| Wire Size | All AWG sizes |
| Speed | The rate the wire traveled as it was coated in multiple passes and baked in a 15-foot, gas-fired oven. |
| Appearance: | |
| G | Indicates good or smooth surface. |
| VSW | Indicates smooth surface with a very slight wave. |
| SW | Indicates minor flaws in the coating surface |
| Heavy Grain | Indicates a rough surface without blisters |
| Rough | Is an indication the coating is unacceptable as it may contain blisters, or a very heavy grain, or an extreme wave. |
| (+) | Indicates slightly better than given rating |
| (−) | Indicates slightly worse than given rating |
| Snap | Measured in accordance with NEMA Standards Publication Part 3, paragraph 3.1.1. |
| Mandrel After Snap | Smallest mandrel around which wire which has been "snapped" as above can be wound without exhibiting surface cracks. |
| Abrasion | Measured in accordance with NEMA |

| Abbreviation Key for Table 1 | |
|---|---|
| Unilateral Scrape Windability | Standard Publication Part 3, paragraph 59.1.1. 1500 volts are passed through a six foot long wire sample which is wrapped around a specified mandrel. The mandrel moves along the wire at fixed rate elongating and abrading the wire. Failure is described when three shorts occur along the surface of the sample. |
| Cut Through | Measured in accordance with NEMA Standards Publication Part 3, paragraph 50.1.1.2. |
| Heat Shock | Tested in accordance with NEMA Standards Publication, Part 3, paragraph 4.1.1. |
| Burn Out | Tested in accordance with NEMA Standards Publication, Part 3, paragraph 53.1.1.4. F.O.M. is Figure of Merit calculated as described in NEMA Standards Publication, Part 3, paragraph 53.1.1.3. |
| A. O. Smith Freon Blister Test | A five-foot sample of wire is wound into a coil which produces four to six percent stretch, baked for two hours at 150° C., then cooled to room temperature. The samples are then placed in a freon bomb charged with Freon 22 ® and the pressure in the bomb is brought up to 600 pounds per square inch by heating and held six hours. After the six-hour hold, the pressure is immediately released and coils are placed in an oven at 150° C. for four hours. The coils are then removed from the oven and checked for blistering. One large blister, or two medium, or five small blister constitutes a failure. The wire is then wrapped around a five times mandrel for ten turns and checked for cracks or peeling. If the coating cracks or peels, it is a failure. Finally, the wire is made into a twisted pair and dielectrics are determined in accordance with NEMA Standards Publication, Part 3, paragraph 7.1.1.3. |
| Dielectrics: | |
| Dry | Determined in accordance with NEMA Standards Publication, Part 3, paragraph 7.1.1.3. |
| Wet | After soaking in water for 24 hours, the samples are tested as described above. |
| Bonding | Determined following the procedure described in NEMA Standards Publication Part 3, paragraph 57.1.1.2. at the temperature stated under Bonding Temperature. |
| Dissipation Factor | Tested in accordance with NEMA Standards Publication, Part 3, Paragraph 9.1.1.2. |
| Heat Aging at 180° C. | Number of hours up to 168 (at 180° C.) required for a sample to be baked to fail a post winding of around a one times mandrel. |

TABLE 1

| | Example 1 | Example 2 | Example 3 | Example 4 | Example 5 | Example 6 | Example 7 | Example 8 |
|---|---|---|---|---|---|---|---|---|
| Basecoat | PE | PE | PEI | PEI | PEI | PEI | PEI | PEI |
| Build (mils) bondcoat/basecoat | 1.0/2.0 | 1.0/2.1 | 1.0/2.0 | 1.0/2.0 | 1.0/2.0 | 1.0/2.0 | 1.0/2.0 | 1.0/2.1 |
| Wire Size (AWG) | 18 | 18 | 18 | 18 | 18 | 18 | 18 | 18 |
| Wire Speed (fpm) | 50 | 50 | 50 | 50 | 50 | 50 | 50 | 50 |
| Appearance, bondcoat/basecoat | VSW/VSW | VSW/VSW+ | VSW/VSW | VSW/VSW | VSW/VSW | VSW/VSW | VSW/VSW | VSW–/VSW |
| MECHANICAL PROPERTIES | | | | | | | | |
| Mandrel, before snap | 1X | 1X | 1X | 1X | 1X | 1X | 1X | 1X |
| Snap (OK or Fail) | OK | OK | OK | OK | OK | OK | OK | OK |
| Mandrel, after snap | 1X | 1X | 1X | 1X | 1X | 1X | 1X | 1X |
| Abrasion (gms.) | 2000+ | 1933 | 1883 | 1866 | 1800 | 1950 | 2000+ | 1933 |
| Windability | 25 | | | | | | | |
| Helical Coil Bonding: | | | | | | | | |
| Bond Temp., °C. | 200 | | 200 | 200 | 200 | 200 | 200 | 200 |
| Bond Str., lbs. @ 25° C. | 10.63 | | 21.7 | 0.4 | 1.0 | 2.9 | 16.2 | 12.5 |
| 150° C. | 6.40 | | 10.9 | 0.0 | 1.0 | 2.0 | 8.0 | 5.2 |
| 180° C. | 3.52 | | 6.2 | 0.0 | 0.0 | 1.4 | 4.7 | 1.5 |
| 200° C. | 2.09 | | 3.2 | 0.0 | 0.0 | 1.4 | 2.2 | 1.1 |
| THERMAL PROPERTIES | | | | | | | | |
| Cut Through Temp., °C. | 365 | 355 | | | | | | |
| Heat Shock, 1X | 50 | 70 | | | | | | |
| (½ Hr. at test, 2X | 80 | 80 | | | | | | |
| temp., 20%, 3X | 100 | 100 | | | | | | |
| pre-stretch), 4X | 100 | 100 | | | | | | |
| Heat Shock Test Temp., °C. | 175 | 175 | | | | | | |
| Burnout (F.O.M.) | 5.4 | | | | | | | |
| Heat Aging (hrs.) | 168-OK | | | | | | | |
| ELECTRICAL PROPERTIES | | | | | | | | |
| Dielectric Strength, dry | 14.6 | | | | | | | |
| (vpm), wet | 11.1 | | | | | | | |
| Dissipation Factor | 11.5 | | | | | | | |
| CHEMICAL PROPERTIES | | | | | | | | |
| A. O. Smith Freon Test; appearance/flexibility dielectric after test (VPM) | Fail | | | | | | | |

| | Example 9 | Example 10 | Example 11 | Example 12 | Example 13 | Example 14 | Example 15 | Example 16 | Example 17 | Comparative Example 1 |
|---|---|---|---|---|---|---|---|---|---|---|
| Basecoat | PEI | PEI | PEI | PEI | PEI | PEI | PEI | PAI/PE | PAI | PE |
| Build (mils) bondcoat/basecoat | 1.0/2.0 | 1.0/2.0 | 1.0/2.0 | 0.9/1.9 | 1.0/2.0 | 1.0/2.0 | 1.0/2.1 | 1.1/0.7/2.3 | 1.0/2.0 | 1.0/2.0 |
| Wire Size (AWG) | 18 | 18 | 18 | 24 | 24 | 24 | 18 | 18 | 18 | 18 |
| Wire Speed (fpm) | 50 | 50 | 50 | 100 | 120 | 130 | 50 | 50 | 40 | 50 |
| Appearance, bondcoat/basecoat | Wavy/ | VSW/VSW | VSW/ | VSW/VSW | VSW/VSW | VSW/VSW | Hvy. Grain/ | VSW/VSW/VSW | VSW/VSW | VSW–/ |
| MECHANICAL PROPERTIES | | | | | | | | | | |
| Mandrel, before snap | | 1X | 1X | 1X | 1X | 1X | 1X | 1X | 1X | 1X |
| Snap (OK or Fail) | | OK | OK | OK | OK | OK | OK | OK | OK | OK |
| Mandrel, after snap | | 1X | 1X | 1X | 1X | 1X | 1X | 1X | 1X | 1X |
| Abrasion (gms.) | | 2000+ | | 1000+ | 1000+ | 1000+ | 1816 | 2000+ | 2000+ | 2000+ |
| Windability | | 20 | | | | | 14 | 17 | | |
| Helical Coil Bonding: | | | | | | | | | | |
| Bond Temp., °C. | | 200 | | 200 | 200 | 200 | 200 | 200 | 200 | 200 |
| Bond Str., lbs. @ 25° C. | | 16.09 | | 6.6 | 9.7 | 9.2 | 18.65 | 19.80 | — | — |
| 150° C. | | 10.88 | | 4.9 | 5.2 | 5.6 | — | — | — | — |
| 180° C. | | 5.87 | | 1.7 | 0.9 | 0.8 | 3.43 | 4.3 | 7.4 | 3.68 |
| 200° C. | | 2.64 | | 0.4 | 0.4 | 0.2 | — | — | — | — |
| THERMAL PROPERTIES | | | | | | | | | | |
| Cut Through Temp., °C. | | 340 | | 342 | 318 | 316 | 325 | 385 | 280 | 260 |
| Heat Shock, 1X | | 80 | | 80 | 60 | 70 | 70 | 80 | 80 | 80 |
| (½ Hr. at test, 2X | | 90 | | 90 | 80 | 80 | 90 | 80 | 90 | 90 |
| temp., 20%, 3X | | 100 | | 100 | 100 | 100 | 100 | 100 | 100 | 100 |
| pre-stretch), 4X | | 100 | | 100 | 100 | 100 | 100 | 100 | 100 | 100 |
| Heat Shock Test Temp., °C. | | 200 | | 200 | 200 | 200 | 260 | 260 | 260 | 260 |
| Burnout (F.O.M.) | | 6.67 | | | | | 8.51 | | 2.46 | 1.13 |
| Heat Aging (hrs.) | | | | | | | | | | |
| ELECTRICAL PROPERTIES | | | | | | | | | | |
| Dielectric Strength, dry | | 15.6 | | | | | 11.5 | 15.9 | 453.0 | 1874.0 |
| (vpm), wet | | 11.1 | | | | | 11.2 | 14.5 | | |
| Dissipation Factor | | 4.92 | | 3.34 | 3.16 | 5.45 | 22.26 | 28.72 | | |
| CHEMICAL PROPERTIES | | | | | | | | | | |
| A. O. Smith Freon Test; appearance/flexibility dielectric after test (VPM) | | OK/OK | | | | | | | | |

| | Comparative Example 2 | Comparative Example 3 | Comparative Example 4 |
|---|---|---|---|
| Basecoat | PEI | PEI | PE |
| Build (mils) bondcoat/basecoat | 1.0/2.0 | 1.0/2.1 | 1.0/2.0 |
| Wire Size (AWG) | 24 | 18 | 18 |
| Wire Speed (fpm) | 90 | 50 | 50 |
| Appearance, bondcoat/basecoat | SW/ | VSW–/ | SW/ |

TABLE 1-continued

| | VSW | VSW | VSW+ | VSW | VSW | VSW | VSW | VSW | VSW | VSW | VSW | VSW |
|---|---|---|---|---|---|---|---|---|---|---|---|---|
| MECHANICAL PROPERTIES | | | | | | | | | | | | |
| Mandrel, before snap | 1X | 1X | 1X | 1X | 1X | 1X | 1X | 1X | 1X | 1X | 1X | 1X |
| Snap (OK or Fail) | Fail | OK | OK | OK | OK | OK | OK | OK | OK | OK | OK | OK |
| Mandrel, after snap | — | 1X | 1X | 1X | 1X | 1X | 1X | 1X | 1X | 1X | 1X | 1X |
| Abrasion (gms.) | — | 1833 | 1808 | 1708 | 1950 | 2000+ | 2000+ | 2000+ | 1916 | 1000+ | 1750 | 1608 |
| Windability | | | | | | | | | | | | |
| Helical Coil Bonding: | | | | | | | | | | | | |
| Bond Temp., °C. | 200 | 200 | 200 | 200 | 200 | 200 | 200 | 200 | 200 | 200 | 200 | 200 |
| Bond Str., lbs. @ 25° C. | — | — | — | — | — | — | — | — | 0.0 | 4.7 | 22.4 | 21.7 |
| 150° C. | — | — | — | 1.25 | — | 5.5 | — | — | — | 0.8 | 11.0 | |
| 180° C. | 0.4 | 6.2 | 2.8 | — | 6.3 | — | — | 3.6 | 0.0 | 0.2 | 2.8 | |
| 200° C. | — | — | — | — | — | — | — | — | — | — | 0.4 | |
| THERMAL PROPERTIES | | | | | | | | | | | | |
| Cut Through Temp., °C. | | | | | | | 280 | | 285 | 334 | 315 | 395 |
| Heat Shock, 1X | | | | | | | 80 | | 90 | 50 | 90 | 20 |
| (½Hr. at test, 2X | | | | | | | 90 | | 100 | 70 | 100 | 30 |
| Temp., 20%, 3X | | | | | | | 100 | | 100 | 80 | 100 | 40 |
| pre-stretch), 4X | | | | | | | 100 | | 100 | 100 | 100 | 40 |
| Heat Shock Test Temp., °C. | | | | | | | 175 | | 200 | 200 | 175 | 175 |
| Burnout (F.O.M.) | | | | | | | | | | | 5.97 | 5.46 |
| Heat Aging (hrs.) | | | | | | | | | | | | |
| ELECTRICAL PROPERTIES | | | | | | | | | | | | |
| Dielectric Strength, dry (vpm), wet | | | | | | | | | | | 11.1 | |
| Dissipation Factor | | | | | | | | | | | | |
| CHEMICAL PROPERTIES | | | | | | | | | | | | |
| A. O. Smith Freon Test; appearance/flexibility dielectric after test (VPM) | | | OK/OK | | | | | | | | | |

It is critical to use terephthalic acid in copolyamides of the invention. Thus if in place of terephthalic acid there is used isophthalic acid in whole or in part as taught by Onder U.S. Pat. No. 4,072,665, the bond strength is reduced.

Thus there were prepared copolyamides similar to Example 1 replacing the terephthalic acid in whole or in part by isophthalic acid.

COMPARATIVE EXAMPLE 5

The procedure was similar to Example 1 but there were used as reactants a 70/30 molar ratio mixture of toluene diisocyanate and methylene diisocyanate and there was used a 65/25/10 molar mixture of dodecanedioic acid, isophthalic acid and terephthalic acid.

COMPARATIVE EXAMPLE 6

The procedure was the same as in Comparative Example 5 except the dibasic acids employed was 65/35 molar mixture of dodecanedioic acid and isophthalic acid.

Examples 1 and 3 which are within the present invention both employ a 65/35 molar mixture of dodecanedioic acid and terephthalic acid. The bond strength of Comparative Example 5, Comparative Example 6, Example 1, and Example 3 were tested by coating their resultant enamel solutions on top of ISOMID-coated wire at 50 ft./min., followed by bonding at 200° C. for 20 minutes under 1-kg load. The results were as set forth in Table 2:

TABLE 2

| Test Specimen | Bond Strength, Lbs. at 180° C. |
|---|---|
| Comparative Example 5 | 4.75 |
| Comparative Example 6 | 3.2 |
| Example 1 | 5.9 |
| Example 3 | 6.2 |

It can be seen from Table 2 that the greater the replacement of terephthalic acid by isophthalic acid the greater the reduction in bond strength.

What is claimed is:

1. A self bondable insulated wire comprising a conductor and an insulating layer of a copolyamide having the recurring unit where AL is the divalent hydrocarbon residue of an unsubstituted aliphatic dicarboxylic acid having at least 6 carbon atoms, R is tolylene, phenylene, where F is O, $CH_2$, or $SO_2$ or is a cycloaliphatic hydrocarbon, Ar is p-phenylene, y is 35 to 80% of the recurring units and z is 65 to 20% of the recurring units.

2. A self-bondable insulated wire according to claim 1 where the conductor is copper.

3. A self-bondable insulated wire according to claim 1 where the copolyamide is directly on the bare wire.

4. A self-bondable insulated wire according to claim 1 where the copolyamide is a topcoat over an insulating basecoat.

5. A self-bondable insulated wire according to claim 4 wherein the basecoat is a polyester, polyester-imide, or an amide-imide.

6. An insulated wire according to claim 1 where y is 35 to 70% of the recurring units.

7. An insulated wire according to claim 6 where y is 40 to 70% of the recurring units.

8. An insulated wire according to claim 7 where y is 60 to 70% of the recurring units.

9. An insulated wire according to claim 8 where y is about 65% of the recurring units.

10. An insulated wire according to claim 1 where R is tolylene, 4,4'-methylene diphenylene or a mixture thereof.

11. An insulated wire according to claim 10 where R has the mole percent ratio of 4-methyl-m-phenylene, 2-methyl-m-phenylene, 4,4'-methylene diphenylene of 40/10/50 to 80/20/0.

12. An insulated wire according to claim 8 where R has the mole percent ratio of 4-methyl-m-phenylene, 2-methyl-m-phenylene, 4,4'-methylene diphenylene of 40/10/50 to 80/20/0.

13. An insulated wire according to claim 1 where AL is $(CH_2)_x$ where x is 4 to 34.

14. An insulated wire according to claim 13 where y is 35 to 70% of the recurring units.

15. An insulated wire according to claim 14 where y is 40 to 70% of the recurring units.

16. An insulated wire according to claim 15 where y is 60 to 70% of the recurring units.

17. An insulated wire according to claim 16 where y is about 65% of the recurring units.

18. An insulated wire according to claim 17 where R is tolylene, 4,4'-methylene diphenylene or a mixture thereof.

19. An insulated wire according to claim 18 where R has the mole percent ratio of 4-methyl-m-phenylene, 2-methyl-m-phenylene, 4,4'-methylene diphenylene of 40/10/50 to 80/20/0.

20. An insulated wire according to claim 16 where R has the mole percent ratio of 4-methyl-m-phenylene, 2-methyl-m-phenylene, 4,4'-methylene diphenylene of 40/10/50 to 80/20/0.

21. An insulated wire according to claim 13 where x is 6 to 12.

22. An insulated wire according to claim 21 where y is 35 to 70% of the recurring units.

23. An insulated wire according to claim 22 where y is 40 to 70% of the recurring units.

24. An insulated wire according to claim 23 where y is 60 to 70% of the recurring units.

25. An insulated wire according to claim 24 where y is about 65% of the recurring units.

26. An insulated wire according to claim 25 where R is tolylene, 4,4'-methylene diphenylene or a mixture thereof.

27. An insulated wire according to claim 26 where R has the mole percent ratio of 4-methyl-m-phenylene, 2-methyl-m-phenylene, 4,4'-methylene diphenylene of 40/10/50 to 80/20/0.

28. An insulated wire according to claim 24 where R has the mole percent ratio of 4-methyl-m-phenylene, 2-methyl-m-phenylene, 4,4'-methylene diphenylene of 40/10/50 to 80/20/0.

29. An insulated wire according to claim 21 where x is 10.

30. An insulated wire according to claim 29 where y is 35 to 70% of the recurring units.

31. An insulated wire according to claim 30 where y is 40 to 70% of the recurring units.

32. An insulated wire according to claim 31 where y is 60 to 70% of the recurring units.

33. An insulated wire according to claim 32 where y is about 65% of the recurring units.

34. An insulated wire according to claim 33 where R is tolylene, 4,4'-methylene diphenylene or a mixture thereof.

35. An insulated wire according to claim 34 where R has the mole percent ratio of 4-methyl-m-phenylene, 2-methyl-m-phenylene, 4,4'-methylene diphenylene of 40/10/50 to 80/20/0.

36. An insulated wire according to claim 32 where R has the mole percent ratio of 4-methyl-m-phenylene, 2-methyl-m-phenylene, 4,4'-methylene diphenylene of 40/10/50 to 80/20/0.

37. A self-bondable insulated wire according to claim 6 comprising the copolyamide as a topcoat over an insulating basecoat which is a polyester, polyester-imide, or an amide-imide.

38. A self-bondable insulated wire according to claim 7 comprising the copolyamide as a topcoat over an insulating basecoat which is a polyester, polyester-imide, or an amide-imide.

39. A self-bondable insulated wire according to claim 8 comprising the copolyamide as a topcoat over an insulating basecoat which is a polyester, polyester-imide, or an amide-imide.

40. A self-bondable insulated wire according to claim 9 comprising the copolyamide as a topcoat over an insulating basecoat which is a polyester, polyester-imide, or an amide-imide.

41. A self-bondable insulated wire according to claim 10 comprising the copolyamide as a topcoat over an insulating basecoat which is a polyester, polyester-imide, or an amide-imide.

42. A self-bondable insulated wire according to claim 11 comprising the copolyamide as a topcoat over an insulating basecoat which is a polyester, polyester-imide, or an amide-imide.

43. A self-bondable insulated wire according to claim 12 comprising the copolyamide as a topcoat over an insulating basecoat which is a polyester, polyester-imide, or an amide-imide.

44. A self-bondable insulated wire according to claim 13 comprising the copolyamide as a topcoat over an insulating basecoat which is a polyester, polyester-imide, or an amide-imide.

45. A self-bondable insulated wire according to claim 14 comprising the copolyamide as a topcoat over an insulating basecoat which is a polyester, polyester-imide, or an amide-imide.

46. A self-bondable insulated wire according to claim 15 comprising the copolyamide as a topcoat over an insulating basecoat which is a polyester, polyester-imide, or an amide-imide.

47. A self-bondable insulated wire according to claim 16 comprising the copolyamide as a topcoat over an insulating basecoat which is a polyester, polyester-imide, or an amide-imide.

48. A self-bondable insulated wire according to claim 17 comprising the copolyamide as a topcoat over an insulating basecoat which is a polyester, polyester-imide, or an amide-imide.

49. A self-bondable insulated wire according to claim 18 comprising the copolyamide as a topcoat over an insulating basecoat which is a polyester, polyester-imide, or an amide-imide.

50. A self-bondable insulated wire according to claim 19 comprising the copolyamide as a topcoat over an insulating basecoat which is a polyester, polyester-imide, or an amide-imide.

51. A self-bondable insulated wire according to claim 20 comprising the copolyamide as a topcoat over an insulating basecoat which is a polyester, polyester-imide, or an amide-imide.

52. A self-bondable insulated wire according to claim 21 comprising the copolyamide as a topcoat over an insulating basecoat which is a polyester, polyester-imide, or an amide-imide.

53. A self-bondable insulated wire according to claim 22 comprising the copolyamide as a topcoat over an insulating basecoat which is a polyester, polyester-imide, or an amide-imide.

54. A self-bondable insulated wire according to claim 23 comprising the copolyamide as a topcoat over an insulating basecoat which is a polyester, polyester-imide, or an amide-imide.

55. A self-bondable insulated wire according to claim 24 comprising the copolyamide as a topcoat over an insulating basecoat which is a polyester, polyester-imide, or an amide-imide.

56. A self-bondable insulated wire according to claim 25 comprising the copolyamide as a topcoat over an insulating basecoat which is a polyester, polyester-imide, or an amide-imide.

57. A self-bondable insulated wire according to claim 26 comprising the copolyamide as a topcoat over an insulating basecoat which is a polyester, polyester-imide, or an amide-imide.

58. A self-bondable insulated wire according to claim 27 comprising the copolyamide as a topcoat over an insulating basecoat which is a polyester, polyester-imide, or an amide-imide.

59. A self-bondable insulated wire according to claim 28 comprising the copolyamide as a topcoat over an insulating basecoat which is a polyester, polyester-imide, or an amide-imide.

60. A self-bondable insulated wire according to claim 29 comprising the copolyamide as a topcoat over an insulating basecoat which is a polyester, polyester-imide, or an amide-imide.

61. A self-bondable insulated wire according to claim 30 comprising the copolyamide as a topcoat over an insulating basecoat which is a polyester, polyester-imide, or an amide-imide.

62. A self-bondable insulated wire according to claim 31 comprising the copolyamide as a topcoat over an insulating basecoat which is a polyester, polyester-imide, or an amide-imide.

63. A self-bondable insulated wire according to claim 32 comprising the copolyamide as a topcoat over an insulating basecoat which is a polyester, polyester-imide, or an amide-imide.

64. A self-bondable insulted wire according to claim 33 comprising the copolyamide as a topcoat over an insulating basecoat which is a polyester, polyester-imide, or an amide-imide.

65. A self-bondable insulated wire according to claim 34 comprising the copolyamide as a topcoat over an insulating basecoat which is a polyester, polyester-imide, or an amide-imide.

66. A self-bondable insulated wire according to claim 35 comprising the copolyamide as a topcoat over an insulating basecoat which is a polyester, polyester-imide, or an amide-imide.

67. A self-bondable insulated wire according to claim 36 comprising the copolyamide as a topcoat over an insulating basecoat which is a polyester, polyester-imide, or an amide-imide.

68. A self-bondable insulated wire according to claim 67 wherein the basecoat is a polyester of tris(2-hydroxyethyl)isocyanurate, ethylene glycol, and terephthalic acid.

69. A self-bondable insulated wire according to claim 67 wherein the basecoat is a polyester-imide made of tris(2-hydroxyethyl) isocyanurate, ethylene glycol, terephthalic acid, methylene dianiline or methylene diphenyl diisocyanate, and trimellitic anhydride.

70. A self-bondable insulated wire coating to claim 67 wherein the basecoat is a polyamide-imide made of trimellitic anhydride and methylene diphenyl diisocyanate or methylenedianiline.

71. A self-bondable insulated wire according to claim 67 wherein the basecoat is a polyester of tris(2-hydroxyethyl isocyanurate, ethylene glycol and terephthalic acid overcoated with a polyamide-imide.

72. A self-bondable insulated wire according to claim 1 which is film wrapped wire and the bondable copolyamide is a coating over the film.

73. An insulated wire according to claim 1 where the copolyamide has the recurring unit where AL is the divalent hydrocarbon residue of an unsubstituted aliphatic dicarboxylic acid having at least 6 carbon atoms, R is tolylene, phenylene or where F is O, $CH_2$, or $SO_2$, Ar is p-phenylene, y is 35 to 80% of the recurring units and z is 65 to 20% of the recurring units.

* * * * *